(12) United States Patent
Thomas

(10) Patent No.: US 6,378,561 B1
(45) Date of Patent: Apr. 30, 2002

(54) SELF-SEALING FLEXIBLE METAL HOSE

(75) Inventor: R. Winfield Thomas, West Lebanon, IN (US)

(73) Assignee: Tru-Flex Metal Hose Corp., West Lebanon, IN (US)

( * ) Notice: Subject to any disclaimer, the term of this patent is extended or adjusted under 35 U.S.C. 154(b) by 0 days.

(21) Appl. No.: 09/792,331

(22) Filed: Feb. 24, 2001

(51) Int. Cl.$^7$ .............................. F16L 11/16
(52) U.S. Cl. .................. 138/135; 138/136; 138/154
(58) Field of Search ................. 158/131, 134, 158/135, 154, 136

(56) References Cited

U.S. PATENT DOCUMENTS

| | | | | |
|---|---|---|---|---|
| 653,487 A | * | 7/1900 | Rudolph | ............ 138/136 |
| 680,983 A | * | 8/1901 | Rudolph | ............ 138/136 |
| 2,402,497 A | * | 6/1946 | Johnson | ............ 138/135 |
| 3,815,639 A | * | 6/1974 | Westerbarkey | ............ 138/135 |
| 3,865,146 A | * | 2/1975 | Meserole | ............ 138/154 |
| 4,029,129 A | * | 6/1977 | Harper | ............ 138/154 |
| 4,129,152 A | * | 12/1978 | Davis | ............ 138/154 |
| 5,758,695 A | * | 6/1998 | Carson | ............ 138/154 |

* cited by examiner

*Primary Examiner*—James Hook
(74) *Attorney, Agent, or Firm*—Shughart Thomson & Kilroy P.C.; Mark E. Brown

(57) ABSTRACT

A self-sealing flexible metal hose includes a band adapted for winding on conventional winding equipment. The band includes receiver and insert assemblies adapted for interlocking with adjacent windings or turns of the band. A sealing flange provides continuous contacts and is urged into sealing engagement with the band by exhaust gas pressure within the hose bore. Alternative embodiments include different configurations of the flanges and legs which form the contacts, and accommodate packing material for greater sealing performance.

1 Claim, 6 Drawing Sheets

SELF-SEALING FLEXIBLE METAL HOSE

BACKGROUND OF THE INVENTION

I. Field of the Invention

The present invention relates generally to flexible metal hose and in particular to a self-sealing hose design adaptable for exhaust gas applications.

II. Description of the Prior Art

Flexible metal hose is commonly used for conveying liquids and gases, particularly in applications where the hose may need to be reconfigured or may need to accommodate relative movement between its respective ends. For example, vehicle exhaust pipe applications commonly use flexible metal hose for conveying exhaust gas. The advantages of flexible metal hose in such applications include its ability to resist vibration and the ability to locate the hose between separate vehicle components, such as an engine and an exhaust system.

The present invention accommodates vibration. Installation is simplified by providing flexibility. Efficient conveyance of exhaust gas is accomplished by configuring the bands with flanges providing a smooth inner bore with multiple contact points for sealing. In particular, the internal pressures tend to increase the sealing effect by pushing the sealing elements against other band elements.

Heretofore there has not been available a flexible metal hose with the advantages and features of the present invention. Prior art flexible hose designs, including the example described herein, lack the sealing features in the combination of the present invention.

SUMMARY OF THE INVENTION

In the practice of the present invention, a self-sealing flexible metal hose is provided which includes a spiral-wound band. The band includes receiver and insert assemblies each comprising double-folded inner and outer legs. The receiver assembly of one winding or turn of the band receives the insert assembly of an adjacent winding or turn whereby the hose is interlocked. The band also includes a flange extending in a downstream direction and engaging the band at multiple contact points for greater sealing capability. Alternative embodiments of the present invention include different configurations of the legs and the flanges, and can include packing material.

OBJECTS AND ADVANTAGES OF THE INVENTIONS

The principal objects and advantages of the present invention include providing flexible metal hose; providing such a hose which is leak-resistant; providing such a hose which is self-sealing, providing such a hose which is well-adapted for exhaust hose application; providing such a hose which resists vibrational loads; providing such a hose which can be manufactured on conventional metal hose winding equipment; and providing such a hose which is efficient in operation, economical to manufacture, capable of a long operating life and which is particularly well adapted for the purposes and applications thereof.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

II. Preferred Embodiment Self-Sealing Flexible Metal Hose

Figure 2:
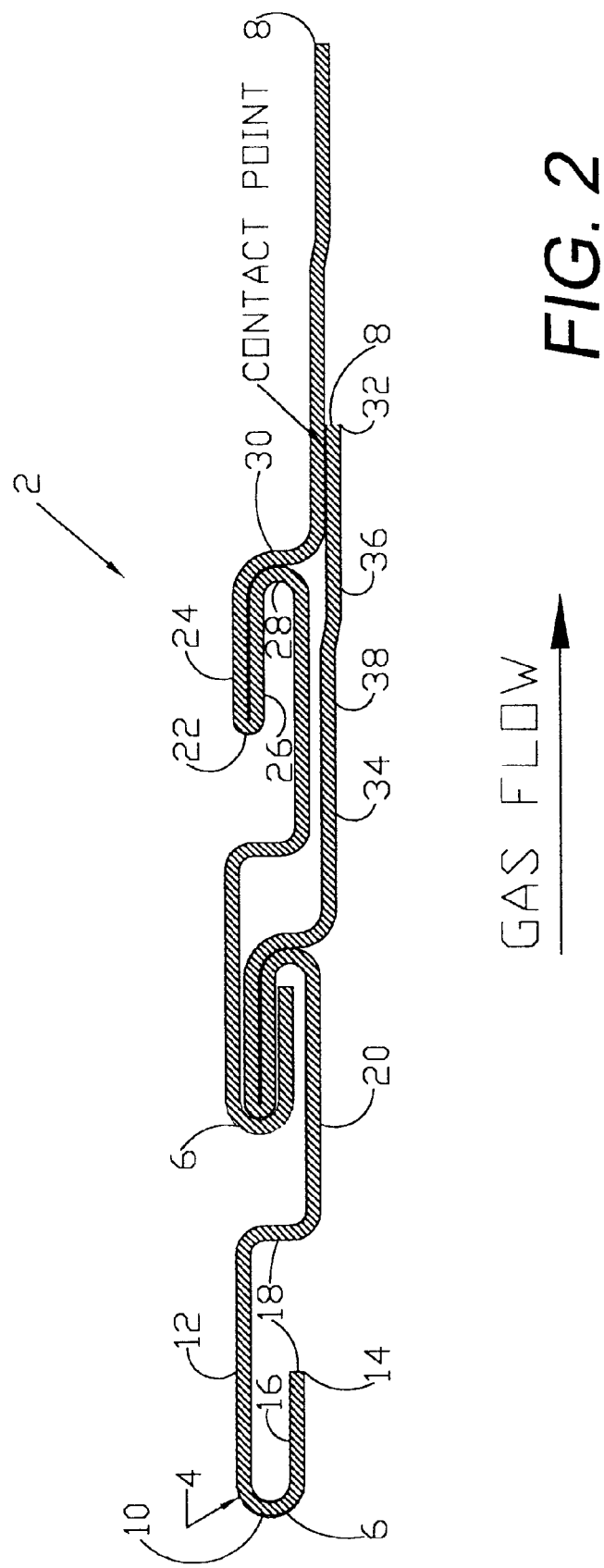
FIG. 2 is a cross-sectional view of a self-sealing flexible metal hose embodying the present invention.

Referring to the drawings in more detail, the reference numeral 2 generally designates a self-sealing flexible metal hose embodying the present invention. The flexible hose 2 compromises a band 4 which is spiral-wound for interlocking in a manner which permits the resulting hose 2 to flex or bend without compromising the fluid-tight characteristics thereof As shown in FIG. 2, the band profile includes a leading edge 6 and a trailing edge 8 located generally upstream and downstream respectively with respect to a gas flow direction through the hose 2.

Figure 1:
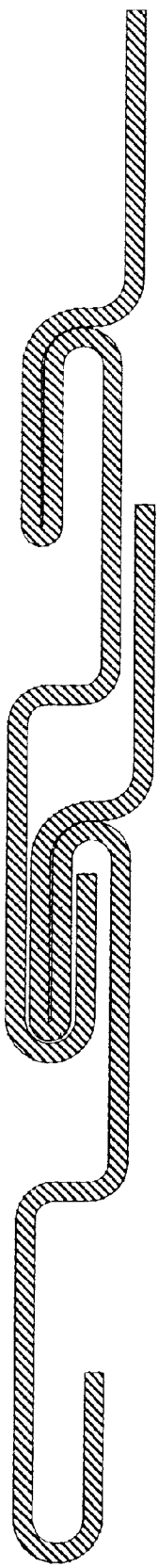
FIG. 1 is a cross-sectional view of a prior art flexible metal hose.

A double-fold receiver assembly 10 is formed adjacent to the leading edge 6 and includes a receiver outer leg 12 connected to a receiver inner leg 14 located in generally parallel, spaced relation therefrom whereby a receiver 16 is defined therebetween. The leading edge 6, which can be curved, connects the receiver assembly legs 12, 14. The receiver assembly 10 also includes a receiver offset 16 connected to the outer leg 12 in spaced relation from the receiver inner leg 14 whereby a clearance 18 is formed and adapted for receiving a double-fold insert assembly 22. The insert assembly 22 is connected to the offset 16 by a transition 20. The insert assembly 22 includes an insert outer leg 24 which is folded double and located adjacent to an insert inner leg 26. As shown in FIG. 1, the legs 24, 26 of the insert assembly 2 are folded relatively tightly with respect to each other, whereas the receiver legs 12, 14 are spaced apart to define a receiver 16 therebetween. The insert legs 24, 26 are spaced outwardly from the transition 20 by upstream and downstream insert offsets 28, 30 respectively. A sealing flange 32 extends downstream from the downstream offset 30 and includes an upstream section 34 and a downstream section 36, the later terminating at the trailing edge 8. A sealing flange offset 38 is located between the sealing flange sections 34, 36 and places the downstream section 36 slightly inwardly from the upstream section 34.

As shown, the hose 2 is assembled with the insert assembly 22 received in the receiver 16 whereby the insert legs 24, 26 are captured between the receiver legs 12, 14 and the insert assembly offsets 28, 30 are captured within the clearance 18. The insert assembly 22 is adapted to slidably move within the clearance 18 to facilitate the hose 2 flexing. Sealing contacts 42, 44 are provided at an upstream location 42.

III. First Modified Embodiment Self-Sealing Flexible Metal Hose 102

Figure 3:
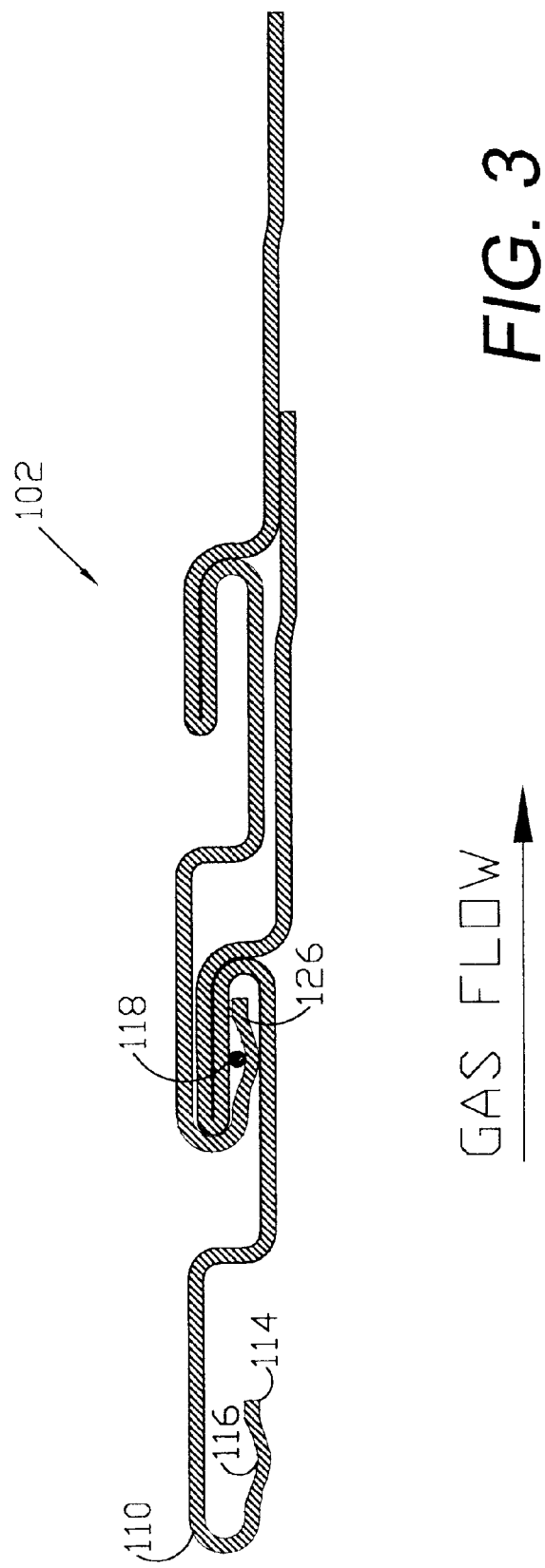
FIG. 3 is a cross-sectional view of a flexible metal hose comprising a first modified embodiment of the present invention.

FIG. 3 shows a hose 102 comprising a first modified embodiment of the present invention and including a modified receiver assembly 110 with an inner leg 114 formed with an outwardly-concave/inwardly-convex channel 116 adapted to receive string-like packing material 118. The packing material 118 facilitates forming a seal between the inner legs 114, 126. The packing material 118 can be spiral wound along with the band 4 as the hose 102 is formed on conventional winding equipment.

IV. Second Modified Embodiment Self-Sealing Flexible Metal Hose 202

Figure 4:
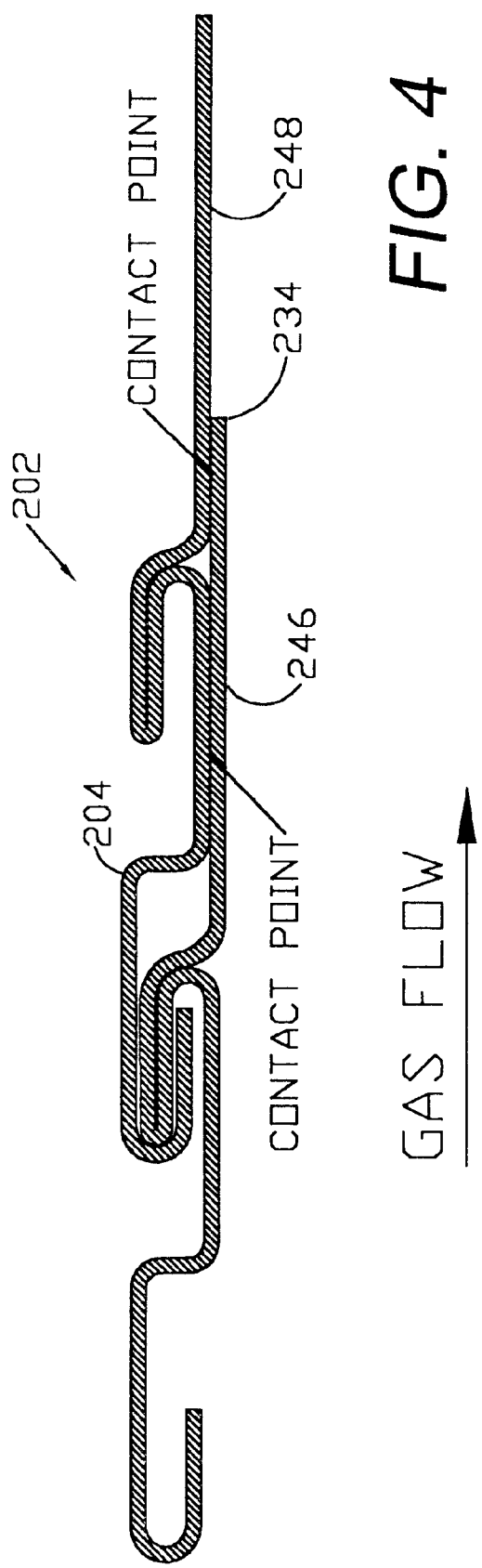
FIG. 4 is a cross-sectional view of a flexible metal hose comprising a second modified embodiment of the present invention.

FIG. 4 shows a flexible hose 202 comprising a second modified embodiment of the present invention. The flexible hose 202 includes a band 204 with a profile which is similar to that of the flexible hose 2 described above, except that the entire sealing flange 234 is substantially co-planer, as are upstream and downstream base sections 246, 248.

V. Third Modified Embodiment Self-Sealing Flexible Metal Hose 302

Figure 5:
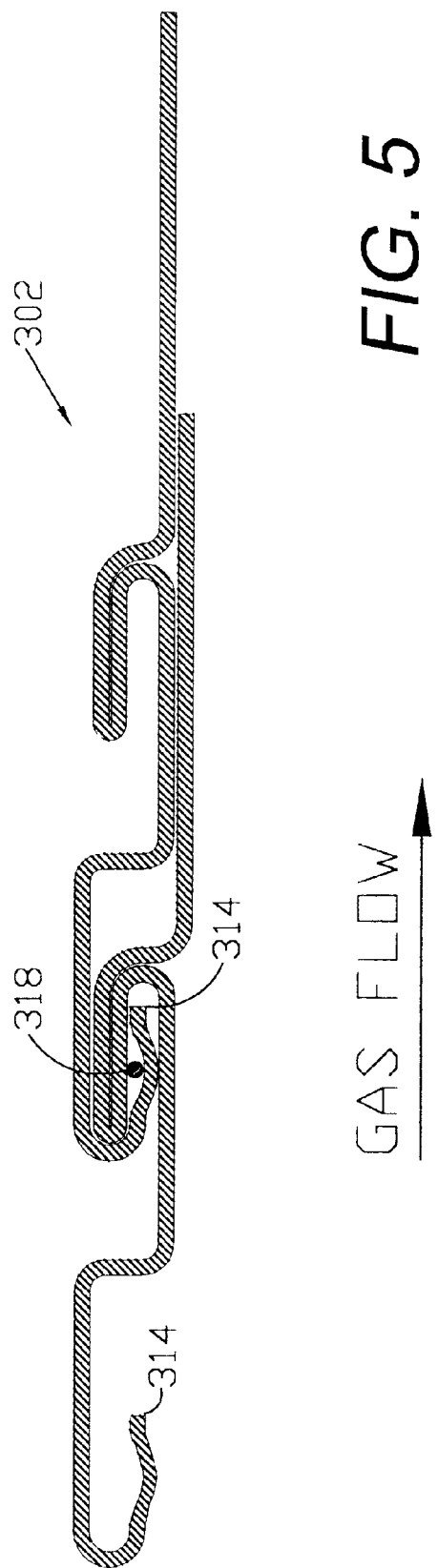
FIG. 5 is a cross-sectional view of a flexible metal hose comprising a third modified embodiment of the present invention.

FIG. 5 shows a flexible metal hose configuration comprising a third modified embodiment of the present invention general designated by the reference numeral 302. The flexible hose 302 is generally similar to the flexible hose 202 described above, with the addition of the reconfigured receiver inner leg 314 for receiving packing material 318.

VI. Fourth Modified Embodiment Self-Sealing Flexible Metal Hose 402

Figure 6:
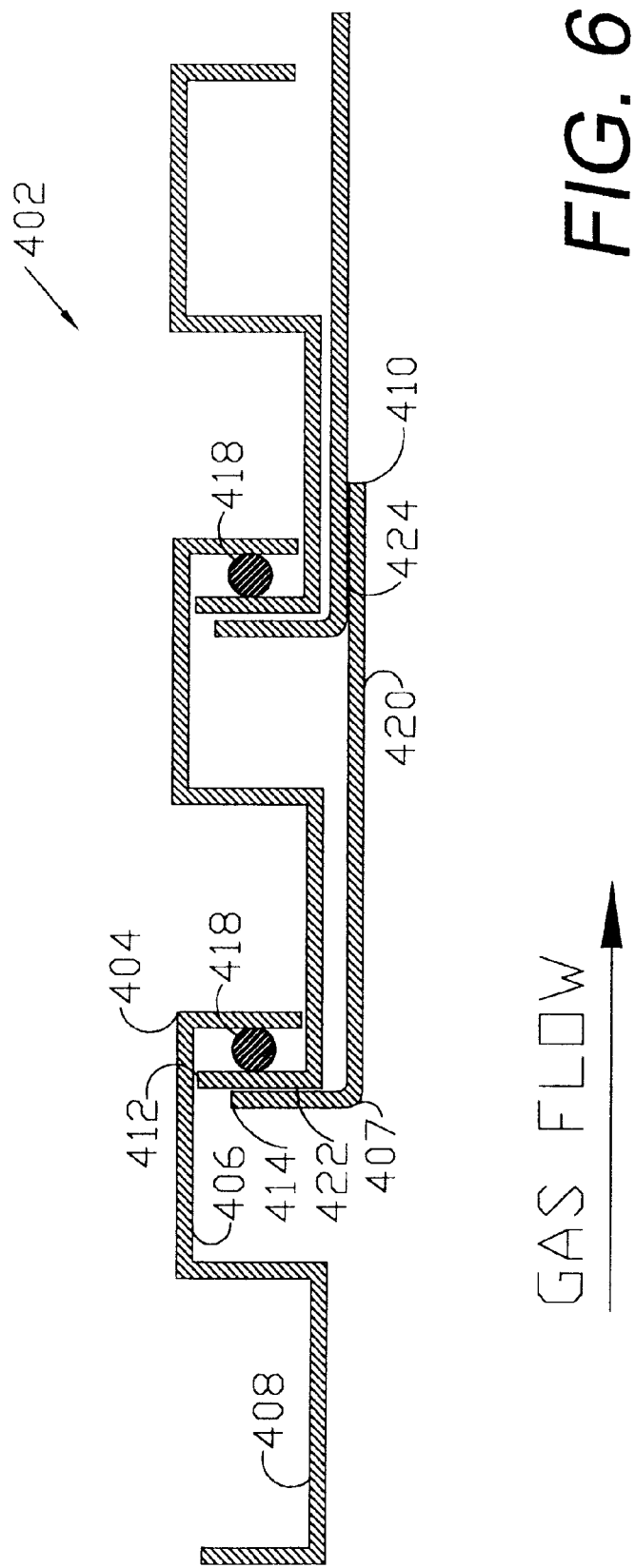
FIG. 6 is cross-sectional view of a flexible metal hose comprising a fourth modified embodiment of the present invention.

FIG. 6 shows a flexible metal hose section 402. As shown, the hose 402 includes an outer band 404 with an S-shaped cross-sectional profile configuration whereby inwardly and outwardly open channels 406, 408 are formed. The inwardly open channel 406 receives packing material 410 and the upstream leg 412 of another section of the outer band 404. An inner band 406 has an L-shaped cross-sectional profile with a base leg 410 and a return leg 412 projecting outwardly therefrom. The return leg 412 engages a respective outer band upstream leg 412 within a respective inwardly-open channel 406. The inner band 406 provides a smoother bore 420 and also increases the sealing aspect of the hose 402 by providing upstream and downstream contact points 422, 424 respectively.

What is claimed is:

1. A self-sealing flexible metal hose, which comprises:
    a) a continuous band, which includes:
        1) a leading edge;
        2) a trailing edge;
        3) a double-folded receiver assembly with inner and outer receiver assembly legs;
        4) a double-folded insert assembly with inner and outer insert assembly legs; and
        5) a sealing flange extending downstream from the insert assembly;
    b) said insert assembly being slidably received within said receiver assembly for providing flexibility of said hose;
    c) said band being spiral-wound with said assemblies interlocking on adjacent windings of said band; and
    d) said flange engaging the band of an adjacent winding and providing multiple continuous contacts therealong.

* * * * *